Patented May 19, 1936

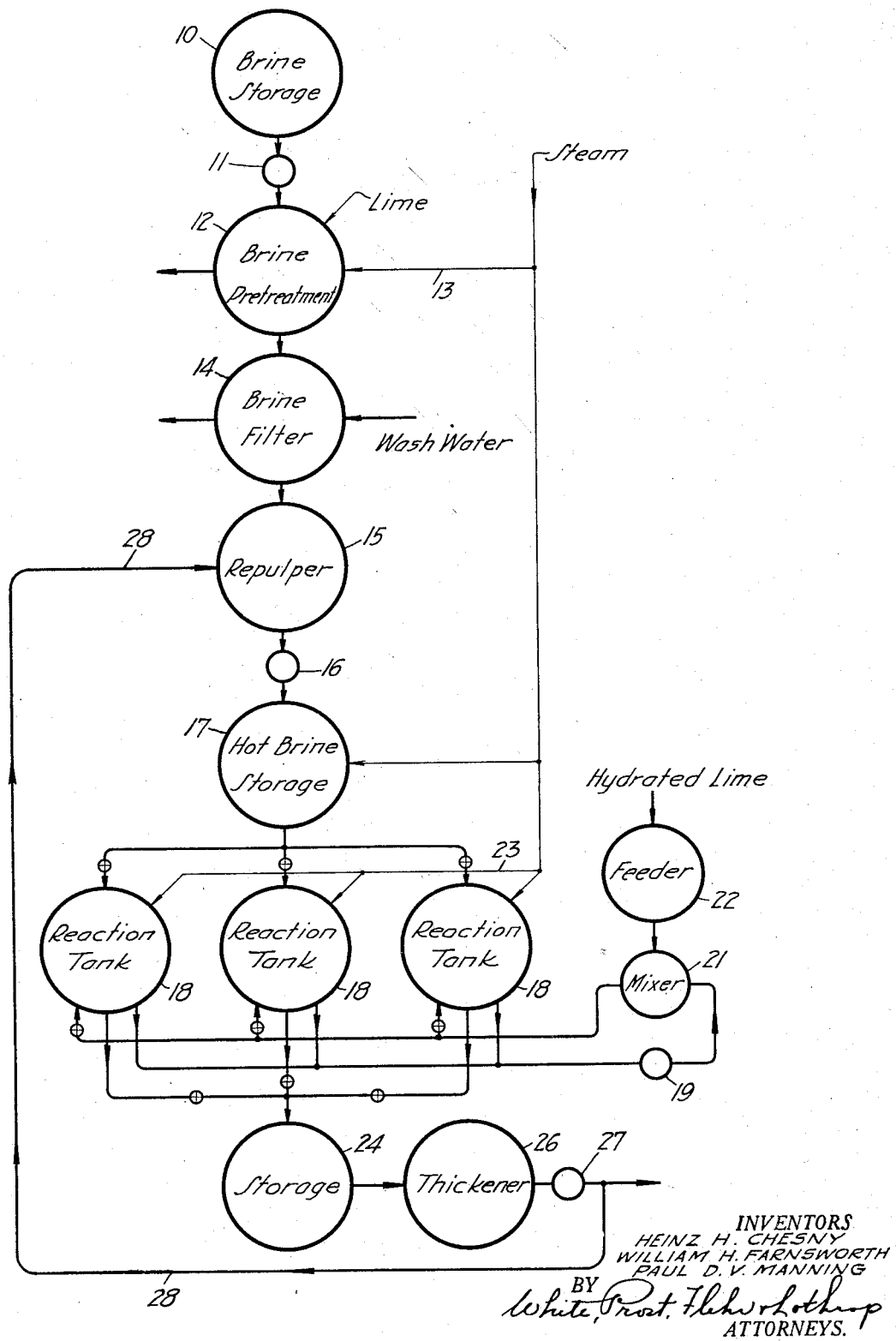

2,041,047

UNITED STATES PATENT OFFICE 2,041,047

PROCESS OF MANUFACTURING MAGNESIUM PRODUCTS

Heinz H. Chesny, San Francisco, William H. Farnsworth, San Mateo, and Paul D. V. Manning, Berkeley Woods, Calif., assignors to Marine Chemicals Company, Ltd., San Francisco, Calif., a corporation of Delaware Application July 23, 1932, Serial No. 624,268

10 Claims. (Cl. 23—201)

This invention relates generally to processes for the commercial manufacture of magnesium products, such as milk of magnesia and magnesium basic carbonate, particularly where the manufacture is from relatively concentrated brines.

It has previously been known that magnesium hydroxide can be precipitated from brines containing convertible magnesium salts, by reacting the brine with a suitable reagent such as calcium hydroxide. In applying such a process to brines which are relatively concentrated, particularly those containing substantial quantities of calcium chloride, many unexpected difficulties and problems are encountered.

The following analysis is given as an example of a concentrated inland brine, which is a waste product resulting from the removal of bromine from a brine found in certain wells at Manistee, Michigan:—

| | |
|---|---|
| Calcium chloride | 13.84% |
| Magnesium chloride | 8.62% |
| Sodium chloride | 5.12% |
| Potassium chloride | 0.61% |
| Misc. including potassium bromide, calcium sulphate and ferric chloride | 0.03% |
| Water by difference | 71.78% |
| Specific gravity | 1.61 |

If it is attempted to react such a brine with lime slurry, that is a suspension of slaked lime in water, it will be found that the precipitate consists largely of magnesium hydroxide in amorphous form, which has a relatively low or negligible settling rate in the brine. It is difficult and tedious to separate such amorphous magnesium hydroxide from the brine, and subsequent washing to remove impurities is likewise a very difficult operation. Furthermore, if it were attempted to precipitate magnesium hydroxide by calcium hydroxide, without special precautions such as disclosed herein, double salts would be formed during the reaction, due to the relatively high percentage of calcium chloride present. The formation of such double salts would not only be at the expense of magnesium hydroxide recovery, but would also cause a wastage of the reacting agent, and lime contamination of the resulting product.

It is an object of the present invention to devise a process for the commercial manufacture of magnesium products from concentrated brines, in which the magnesium hydroxide will be precipitated from the brine in such form as to have a relatively high settling rate, as distinguished from magnesium hydroxide in the amorphous form.

It is a further object of the invention to devise a process of the above character which will preclude the formation of double magnesium salts during reaction of the brine with calcium hydroxide.

It is a further object of the invention to provide a process of the above character which can be employed to economically manufacture magnesium products of relatively high quality and purity.

Our process can be best explained by first referring to the flow sheet illustrated in the accompanying drawing. A source of the concentrated brine to be treated is indicated at 10, and brine from this point is delivered by pump 11 to one or more pretreatment vessels indicated at 12. Pretreatment is chiefly for the purpose of removing certain ingredients which would be difficult to remove subsequently in the process and which will contaminate the product, particularly iron in the case of Manistee brine. Iron is removed at this point by adding suitable amounts of calcium hydroxide, without adding a sufficient quantity of the reagent to cause precipitation of an appreciable amount of magnesium hydroxide. The iron content in the brine is due largely to treatment and handling of the brine in iron vessels and conduits, while bromine is being removed. For example the proper amount required for treatment of waste Manistee brine is about one pound of CaO per 1000 gallons of brine. Heating and agitation of the brine during pretreatment is advantageous, and can be accomplished by introducing low pressure steam, as indicated at 13. The greater amount of the resulting sludge is removed by settling, and the pretreated brine is then filtered as indicated at 14.

The clear brine filtrate from 14 is then introduced into a repulper 15 where seed crystals are added, from which it is delivered by pump 16 to a point of storage 17. At this point of storage the mixture is heated to an elevated temperature of about 60° centigrade, as by introducing live steam.

After being heated at 17 it is delivered in suitable quantities to any one of a plurality of reaction tanks 18. Dry calcium hydroxide in divided condition is introduced directly into the brine at this point. For this purpose we have indicated a liquid recirculation path including a pump 19 and a mixer 21, which may be selectively connected to any one of tanks 18 in which there is a batch of brine seed mixture to be treated.

Dry calcium hydroxide in divided condition can be supplied to mixer 21, at a controlled predetermined rate, by the feeder 22. Mixer 21 serves to intermix the dry calcium hydroxide directly with the brine being recirculated by pump 19. (It is within the reaction tanks 18 that magnesium hydroxide is precipitated, by the reaction.) A batch of reacting liquor being treated in one of these tanks is maintained at an elevated temperature of about 60° C. by live steam introduction indicated at 23.

From reaction tanks 18, the liquid, together with the precipitate, is delivered to a point of storage 24, from which it is then delivered continuously at a constant rate to a suitable thickener 26. The thickened magnesium hydroxide suspension from thickener 26 is delivered for further treatment by pump 27, and a portion of it is returned as indicated by line 28 to the repulper 15. This is for the purpose of introducing seed crystals of magnesium hydroxide into the brine, prior to reacting the brine with dry calcium hydroxide. Repulper 15 is provided with suitable agitating means to secure thorough intermixing.

It may be explained generally that when the process is properly conducted, the magnesium hydroxide precipitated is in the crystalline form, the particles being relatively small but of rather uniform size. Such a precipitate has a relatively high settling rate in the brine, as distinguished from the amorphous form of magnesium hydroxide. Likewise the process when properly conducted is characterized by the absence of formation of double salts of magnesium and calcium, the detrimental effects of which have been previously pointed out.

To enable a clear understanding of the various factors affecting the reactions, we may explain that under proper controlled conditions, to secure magnesium hydroxide suspension consisting of small uniform crystalline particles, the rate of reaction between the calcium hydroxide and the magnesium chloride must approximately equal the rate of crystallization, so that all of the magnesia leaving the solution may be precipitated in the desired crystalline form, rather than as a slimy or amorphous precipitate. Too rapid a rate of reaction tends to cause an amorphous precipitate, because the rate of reaction is then substantially greater than the rate of crystallization. The rate of crystallization is augmented by seeding the brine with previously precipitated magnesium hydroxide crystals, but because there is a practical limit to the rate of crystallization which can be produced by seeding, the rate of reaction must be considerably slower than that which would be effected by introducing a digested lime slurry into the brine. The rate of reaction is materially decreased by the use of dry lime hydrate in divided condition, in the absence of lime in free solution, for the reason that as particles of the lime are contacted with the brine, they each immediately become coated with a film of magnesium hydroxide. This coating of the lime particles materially retards the rate of solubility of the calcium hydrate and therefore retards the rate of the reaction.

If the lime particles are too large, water passes thru the film of magnesium hydroxide and forms an inner saturated solution of lime, and the film eventually bursts, allowing this saturated solution of calcium hydroxide to be ejected, thus increasing the concentration of the magnesium hydroxide faster than the rate of crystallization, so that the amorphous form or even a gel results.

In actual practice with our process we prefer to utilize a lime having a relatively high availability, say of 85% or more. Good results have been secured with a lime sufficiently finely divided to pass a 200 mesh screen, although varying degrees of fineness can be employed with different types of this material.

It has previously been stated that the rate of formation of magnesium hydroxide should approximately equal the rate of crystallization. In addition to carrying out the reaction by directly introducing dry calcium hydroxide, we prefer to control the rate of introduction of the dry calcium hydroxide to further control the rate of the reaction. For example, for waste Manistee brine the rate of introduction should not exceed 22.04 lbs. per minute, for a batch of brine consisting of about 1440 gallons.

The dry calcium hydroxide should be as free as possible from carbonate, and it should be introduced into the brine evenly in such a way as to prevent lumping or agglomeration of particles. It should also be introduced into the brine in presence of small seed crystals of magnesium hyroxide, while avoiding circulation of the main crystalline mass through the brine-lime mixer. The resulting mixture should then be immediately contacted with the main body of the brine. The period during which the dry calcium hydroxide is being added should be substantially less than the total period of reaction. The total time period for liming and reaction can be slightly under three hours, for this particular brine and for the general conditions of the process disclosed herein.

During the reaction period the mass of brine should be gently agitated, to insure removal of mother liquor from around the crystals of magnesium hydroxide, with a minimum of grinding or disintegration of the crystals.

The effect of maintaining the brine at an elevated temperature, during the reaction, is somewhat complicated, but can be explained generally as follows:—Considered from the standpoint of aqueous solutions of the single substances, the effective increase in the temperature of reaction is first to increase the rate of solution of lime and the rate of reaction, as well as decreasing the solubility of the magnesium hydroxide. Such effects, by themselves, are undesirable. On the other hand, an increase in temperature decreases the solubility of the lime, decreases the tendency toward double salt formation and lowers the viscosity of the mother liquor and thereby increases the rate of crystallization. Furthermore the solubility of the amorphous form of magnesium hydroxide (which tends to precipitate first from the solution) gradually decreases as the temperature increases until it equals the solubility of the crystalline form at or near the boiling point of water. The last mentioned effects of increasing temperature are favorable, and it has been found that they offset to a practical degree the unfavorable effects previously mentioned. Therefore during reaction within tank 17, the temperature of the brine can be maintained at or near 60° centigrade with good results, and should not be lower than about 45° C.

The process is not critical with respect to the amount of seed crystals of magnesium hydroxide present in a batch of brine being treated. However, a sufficient amount of seed crystals should be provided to secure the desired effect of augmenting the rate of crystallization, so that under the other conditions of the reaction, the rate of crystal formation is substantially equal to the rate of reaction.

Our invention affords a practical commercial process for the manufacture of magnesium hydroxide products from concentrated brines, at a minimum of cost. The magnesium hydroxide suspension obtained as a result of the steps outlined above can be readily washed to remove impurities, thus making possible the production of relatively pure commercial products, such as milk of magnesia or magnesium basic carbonate.

We claim:

1. In a process for the manufacture of magnesium products from concentrated brines, the step of reacting the brine with calcium hydroxide in the presence of previously precipitated seed crystals of magnesium hydroxide.

2. In a process for the manufacture of magnesium products from concentrated brines, the step of reacting the brine while at an elevated temperature with calcium hydroxide, in the presence of seed crystals of magnesium hydroxide.

3. In a process for the manufacture of magnesium products from concentrated brines, the step of reacting a batch of the brine with calcium hydroxide in such a manner as to precipitate crystalline magnesium hydroxide, introducing a portion of said crystals into a succeeding batch of brine, and reacting said succeeding batch of brine with calcium hydroxide.

4. In a process for the manufacture of magnesium products from concentrated brines, the steps of heating the brine to an elevated temperature, together with seed crystals of magnesium hydroxide, and reacting a batch of the heated brine with calcium hydroxide to effect precipitation of magnesium hydroxide.

5. In a process for the manufacture of magnesium products from concentrated brines, the steps of reacting the brine with calcium hydroxide while the brine is at an elevated temperature, and limiting the rate of the reaction to cause formation of magnesium hydroxide in crystalline form, said rate being limited by introducing the calcium hydroxide in dry divided condition into the brine at a controlled rate.

6. In a process for the manufacture of magnesium products from concentrated brines, the step of feeding dry calcium hydrate at a controlled rate into a batch of the brine, while the temperature of the brine is maintained sufficiently elevated to prevent double salt formation.

7. In a process for the manufacture of magnesium products from concentrated brines, the steps of feeding dry calcium hydrate in divided condition into a batch of the brine, while the brine is at a sufficiently elevated temperature to prevent double salt formation, and causing the brine to be seeded with previously precipitated magnesium hydroxide crystals, whereby the rate of reaction will substantially equal the rate of crystallization.

8. In a process for the manufacture of magnesium products from concentrated brines, the steps of reacting the brine with calcium hydroxide to effect precipitation of magnesium hydroxide, and causing the reaction to proceed at a rate substantially equal to the rate of crystallization of the magnesium hydroxide.

9. In a process for the manufacture of magnesium products from concentrated brines, the step of feeding dry calcium hydrate at a controlled rate into a batch of the brine, while the temperature of the brine is maintained at an elevated temperature of about 60° C. to prevent double salt formation.

10. In a process for the manufacture of magnesium products from concentrated brines, the step of reacting a batch of the brine with calcium hydroxide in the presence of a minor portion of the seed crystals of magnesium hydroxide precipitated from a preceding batch of brine, while the brine is at an elevated temperature of about 60° C.

HEINZ H. CHESNY.
WILLIAM H. FARNSWORTH.
PAUL D. V. MANNING.